(12) United States Patent
Yanagihara et al.

(10) Patent No.: US 11,169,526 B2
(45) Date of Patent: Nov. 9, 2021

(54) VEHICLE CONTROL DEVICE

(71) Applicant: HONDA MOTOR CO., LTD., Tokyo (JP)

(72) Inventors: Suguru Yanagihara, Wako (JP); Hiroshi Miura, Wako (JP); Marina Saikyo, Wako (JP)

(73) Assignee: Honda Motor Company, Ltd., Tokyo (JP)

( * ) Notice: Subject to any disclaimer, the term of this patent is extended or adjusted under 35 U.S.C. 154(b) by 289 days.

(21) Appl. No.: 16/276,175

(22) Filed: Feb. 14, 2019

(65) Prior Publication Data

US 2019/0258259 A1 Aug. 22, 2019

(30) Foreign Application Priority Data

Feb. 16, 2018 (JP) .............................. JP2018-026295

(51) Int. Cl.
| | |
|---|---|
| *B60W 30/08* | (2012.01) |
| *B60W 30/09* | (2012.01) |
| *B60W 30/095* | (2012.01) |
| *B60W 30/18* | (2012.01) |
| *B60W 40/06* | (2012.01) |
| *B60W 60/00* | (2020.01) |
| *G05D 1/02* | (2020.01) |
| *G05D 1/00* | (2006.01) |
| *G06K 9/00* | (2006.01) |

(52) U.S. Cl.
CPC ......... *G05D 1/0212* (2013.01); *G05D 1/0088* (2013.01); *G05D 1/0231* (2013.01); *G06K 9/00798* (2013.01); *G05D 2201/0213* (2013.01)

(58) Field of Classification Search
CPC ....... B60W 30/0956; B60W 30/18163; B60W 60/00; B60W 60/001; B60W 60/0015; B60W 60/0016; B60W 60/0017; B60W 60/0027; B60W 30/095; B60W 40/06; B60W 2552/00; B60W 30/08; B60W 30/09; B60W 30/0953; G05D 1/0212; G05D 1/0231; G05D 1/0088; G05D 2201/0213; G06K 9/00798; G06K 9/00791
USPC ......................................................... 701/27
See application file for complete search history.

(56) References Cited

U.S. PATENT DOCUMENTS

| | | | | |
|---|---|---|---|---|
| 2016/0176398 A1* | 6/2016 | Prokhorov | ............ | B60W 30/09 701/23 |
| 2017/0329337 A1* | 11/2017 | Kusano | .............. | G08G 1/09675 |
| 2020/0377089 A1* | 12/2020 | Fukushige | ........ | B60W 50/0225 |

FOREIGN PATENT DOCUMENTS

| | | | |
|---|---|---|---|
| JP | 5251467 B2 | | 7/2013 |
| JP | 6589658 B2 | * | 10/2019 |

\* cited by examiner

*Primary Examiner* — Abby Y Lin
*Assistant Examiner* — Hossam M Abd El Latif
(74) *Attorney, Agent, or Firm* — Carrier Blackman & Associates, P.C.; Joseph P. Carrier; Jeffrey T. Gedeon

(57) ABSTRACT

If an external environment recognition unit recognizes a particular section adjacent to a first travel path, a trajectory generation unit generates a first travel trajectory that causes the own vehicle to enter the first travel path after a travel along the first travel path inside the particular section, and if the external environment recognition unit does not recognize the particular section, the trajectory generation unit generates a second travel trajectory that causes the own vehicle to directly enter the first travel path from outside the first travel path.

10 Claims, 5 Drawing Sheets

VEHICLE CONTROL DEVICE

CROSS-REFERENCE TO RELATED APPLICATION

This application is based upon and claims the benefit of priority from Japanese Patent Application No. 2018-026295 filed on Feb. 16, 2018, the contents of which are incorporated herein by reference.

BACKGROUND OF THE INVENTION

Field of the Invention

The present invention relates to a vehicle control device that controls an own vehicle so as to enter a road from outside the road.

Description of the Related Art

An automated driving vehicle, which can automatically perform traveling and steering partially or entirely, travels while recognizing a travel lane on the vehicle side. Japanese Patent No. 5251467 discloses a device in which an information acquisition unit of an own vehicle acquires road information regarding a road from a road-side device installed on the road, and using this road information, the type of a travel lane (a right or left turn lane, and a through lane) included in a travel path is identified.

SUMMARY OF THE INVENTION

The device disclosed in Japanese Patent No. 5251467 is excellent in that the device can recognize the travel lane correctly; however, this device has a problem that the device cannot recognize the travel lane in an area where the road-side device is not installed on the road. Infrastructure development in a wide range has been difficult recently, and in view of this, it is practical to acquire the information regarding the travel lane by means of, for example, a camera that photographs the area ahead of the own vehicle without depending on the external information.

In a case of recognizing the travel lane on the basis of the image information about the area ahead of the own vehicle, which is acquired by the camera, a lane mark that sections the travel lane is identified. In the current image recognition techniques, the camera can recognize more easily the lane mark that is extended in a direction that is closer to a direction parallel to the optical axis of the camera, and less easily the lane mark that is extended in a direction away from the direction parallel to the optical axis of the camera. Therefore, if the own vehicle will enter the travel path by turning right or left, the type of the lane mark on the travel path to which the own vehicle will enter is not recognized easily.

In some regions, a road including a first travel path and a second travel path, whose traveling directions are opposite, includes a particular section (a yellow lane or a channelizing zone) between the first travel path and the second travel path. In this particular section, vehicles can travel in directions opposite to each other. In such regions, the own vehicle, which is going to enter the first travel path while crossing the second travel path, is obliged to or accustomed to enter the first travel path after traveling or waiting in the particular section.

The present invention has been made in view of the above problem, and an object is to provide a vehicle control device that enables optimal travel control in either case where a road includes or does not include a particular section.

A vehicle control device according to the present invention includes: an external environment recognition unit configured to recognize a peripheral state of an own vehicle; a trajectory generation unit configured to generate a travel trajectory of the own vehicle on a basis of a recognition result from the external environment recognition unit; and a vehicle controller configured to cause the own vehicle to travel along the travel trajectory, wherein when the own vehicle enters a travel path from outside the travel path, if the external environment recognition unit recognizes a particular section adjacent to the travel path, the trajectory generation unit is configured to generate a first travel trajectory that causes the own vehicle to enter the travel path after a travel along the travel path inside the particular section, and if the external environment recognition unit does not recognize the particular section, the trajectory generation unit is configured to generate a second travel trajectory that causes the own vehicle to directly enter the travel path from outside the travel path.

In the above structure, the first travel trajectory is generated in the case where the particular section is provided adjacent to the travel path, and the second travel trajectory is generated in the case where the particular section is not provided. Thus, optimal travel control in accordance with the presence or absence of the particular section can be performed.

In the present invention, the trajectory generation unit may be configured to generate the first travel trajectory in a case where the external environment recognition unit has recognized the particular section after the second travel trajectory was generated and before the own vehicle enters the travel path.

The above structure enables the own vehicle to enter the particular section because the first travel trajectory is generated even after the second travel trajectory is generated.

In the present invention, the vehicle control device may further include: a front camera configured to photograph an area ahead of the own vehicle; and a side camera configured to photograph an area beside the own vehicle as compared to the front camera, wherein the external environment recognition unit may be configured to recognize the peripheral state by image information from the side camera which has priority over image information from the front camera.

In the above structure, the image information from the side camera, which can recognize the lane mark extended beside the own vehicle easily, has priority before or while the own vehicle turns right or left; therefore, the particular section can be recognized with higher accuracy. In addition, the calculation load for performing the recognition on the basis of the image information from the front camera can be reduced.

In the present invention, the external environment recognition unit may be configured to, if recognizing a travel lane that is sectioned on both sides in a width direction by yellow lane marks or two-line lane marks, recognize this travel lane as the particular section.

The above structure enables the own vehicle to enter the first travel path after traveling in what is called a yellow lane that is sectioned by the yellow lane mark.

In the present invention, the vehicle control device may further include map information including information regarding the particular section included in the road, wherein the trajectory generation unit may be configured to, if the external environment recognition unit recognizes the particular section on a basis of the map information, generate the first travel trajectory and, if the external environment recognition unit does not recognize the particular section on the basis of the map information, generate the second travel trajectory.

In the above structure, the presence or absence of the particular section is recognized by using the map information that is stored in advance; therefore, the presence or absence of the particular section can be recognized correctly and easily.

In the present invention, if the external environment recognition unit recognizes a travel lane where vehicles can travel in opposite directions as the particular section and recognizes another vehicle that travels in the travel lane in a direction opposite to a direction where the own vehicle is going to travel, the vehicle controller may be configured to cause the own vehicle to travel along the first travel trajectory after the external environment recognition unit recognizes that the other vehicle has passed the travel lane ahead of the own vehicle.

The above structure causes the own vehicle to enter the particular section after the other vehicle has passed the travel lane corresponding to the particular section; therefore, it is possible to prevent the own vehicle and the other vehicle from facing each other in the particular section.

In the present invention, if the external environment recognition unit recognizes a first other vehicle and a second other vehicle that travel in opposite directions in the same travel lane, the external environment recognition unit may be configured to recognize the travel lane as the particular section.

In the above structure, the presence or absence of the particular section is recognized on the basis of behavior of the other vehicle that is easily recognized; therefore, the presence or absence of the particular section can be recognized correctly and easily.

In the present invention, the vehicle controller may be configured to cause the own vehicle to enter the travel path from the particular section before a distance for which the own vehicle has traveled in the particular section becomes a predetermined distance or a time for which the own vehicle has traveled in the particular section becomes a predetermined time.

In the above structure, it is possible to prevent the own vehicle from traveling more than necessary in the particular section.

According to the present invention, the optimal travel control in accordance with the presence or absence of the particular section can be performed.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

A preferred embodiment of a vehicle control device according to the present invention will be described in detail with reference to the attached drawings.

1. Structure of Own Vehicle 10

Figure 1:
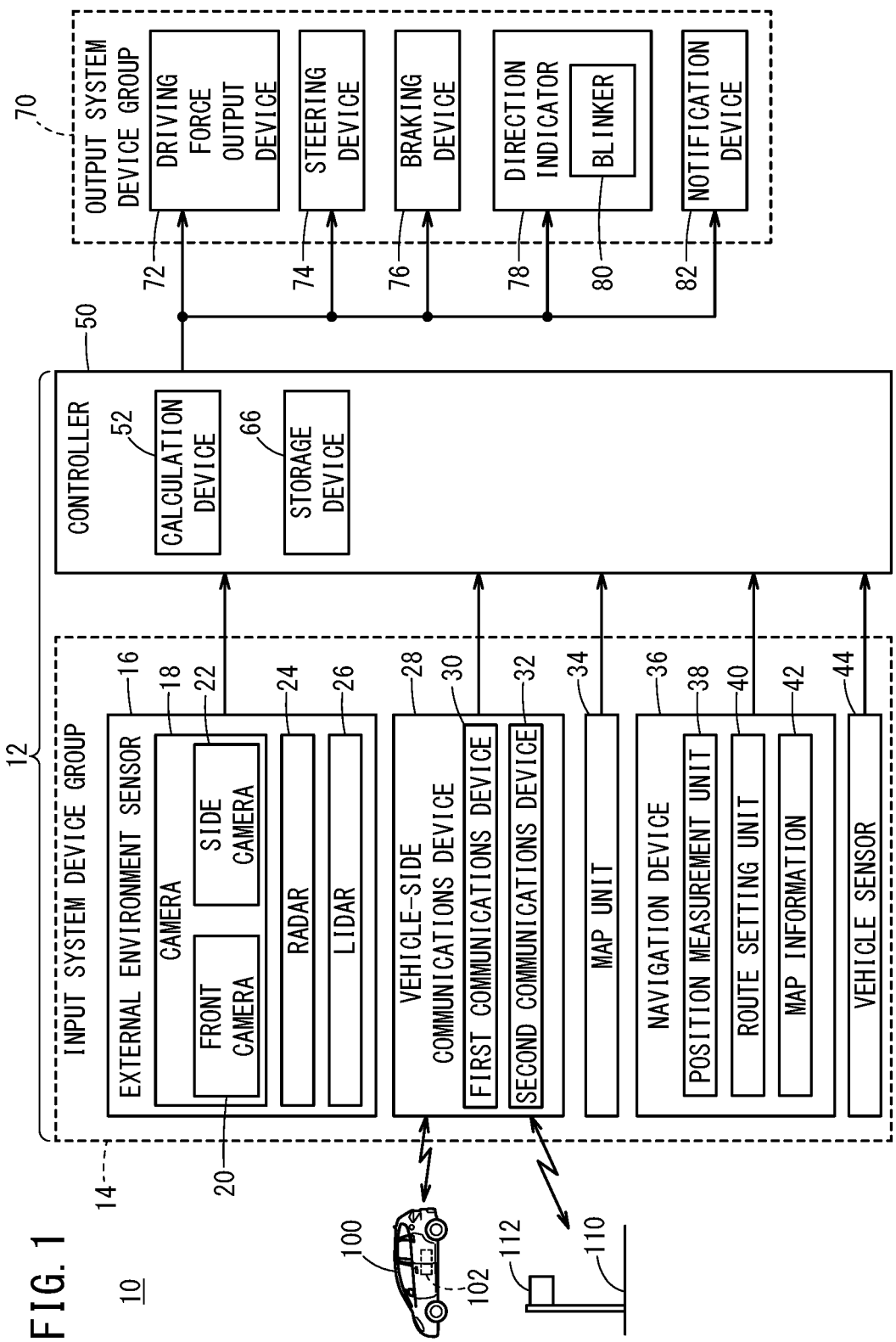
FIG. 1 is a block diagram of a vehicle including a vehicle control device according to one embodiment.

As illustrated in FIG. 1, an own vehicle 10 includes an input system device group 14 that acquires or stores various kinds of information, a controller 50 to which information output from the input system device group 14 is input, and an output system device group 70 that operates in accordance with various instructions output from the controller 50. A vehicle control device 12 according to the present embodiment includes the input system device group 14 and the controller 50. The own vehicle 10 is an automated driving vehicle in which travel control is performed by the controller 50 (including fully automated driving vehicle) or a driving assistance vehicle in which travel control is assisted partially.

1.1. Input System Device Group 14

The input system device group 14 includes an external environment sensor 16, a vehicle-side communications device 28, a map unit 34, a navigation device 36, and vehicle sensors 44. The external environment sensor 16 detects a state of a periphery (external environment) of the own vehicle 10. The external environment sensor 16 includes a plurality of cameras 18 that photographs the external environment, a plurality of radars 24 and one or more LIDARs 26 that detect the distance and the relative speed between the own vehicle 10 and peripheral objects. The cameras 18 include a front camera 20 that photographs an area ahead of the own vehicle 10, and a side camera 22 that photographs a side area of the own vehicle 10. The vehicle-side communications device 28 includes a first communications device 30 and a second communications device 32. The first communications device 30 performs inter-vehicle communications with a communications device 102 provided to another vehicle 100 to acquire external environment information including information regarding the other vehicle 100 (such as a vehicle type, a travel state, or a travel position). The second communications device 32 performs road-vehicle communications with a road-side communications device 112 provided to an infrastructure such as a road 110 to acquire external environment information including the road information (such as information regarding a traffic light or a traffic jam). The map unit 34 stores the number of lanes, the type of lane, the lane width, and the like. The navigation device 36 includes a position measurement unit 38 that measures the position of the own vehicle 10 by a satellite navigation method and/or a self-contained navigation method, map information 42, and a route setting unit 40 that sets a scheduled route from the position of the own vehicle 10 to a destination on the basis of the map information 42. The vehicle sensors 44 detect the travel state of the own vehicle 10. The vehicle sensors 44 include a vehicle speed sensor, an acceleration sensor, a yaw rate sensor, an inclination sensor, a travel distance sensor, and the like, that are not shown.

1.2. Output System Device Group 70

The output system device group 70 includes a driving force output device 72, a steering device 74, a braking device 76, a direction indicator 78, and a notification device 82. The driving force output device 72 includes a driving force output ECU, and a driving source such as an engine or a driving motor. The driving force output device 72 generates driving force in accordance with an occupant's operation of an accelerator pedal or a driving control instruction that is output from the controller 50. The steering device 74 includes an electric power steering system (EPS) ECU and an EPS actuator. The steering device 74 generates a steering force in accordance with an occupant's operation of a steering wheel or a steering control instruction that is output from the controller 50. The braking device 76 includes a braking ECU and a braking actuator. The braking device 76 generates a braking force in accordance with an occupant's operation of a braking pedal or a braking control instruction that is output from the controller 50. The direction indicator 78 includes a blinker ECU and a blinker 80. The direction indicator 78 turns on or off the blinker 80 in accordance with an occupant's operation of a blinker switch and/or an instruction signal for the blinker 80 that is output from the controller 50. The notification device 82 includes a notification ECU and an information transmission device (such as a display device, an acoustic device, or a tactile device). The notification device 82 notifies an occupant in accordance with a notification instruction that is output from the controller 50 or another ECU.

1.3. Controller 50

Figure 2:
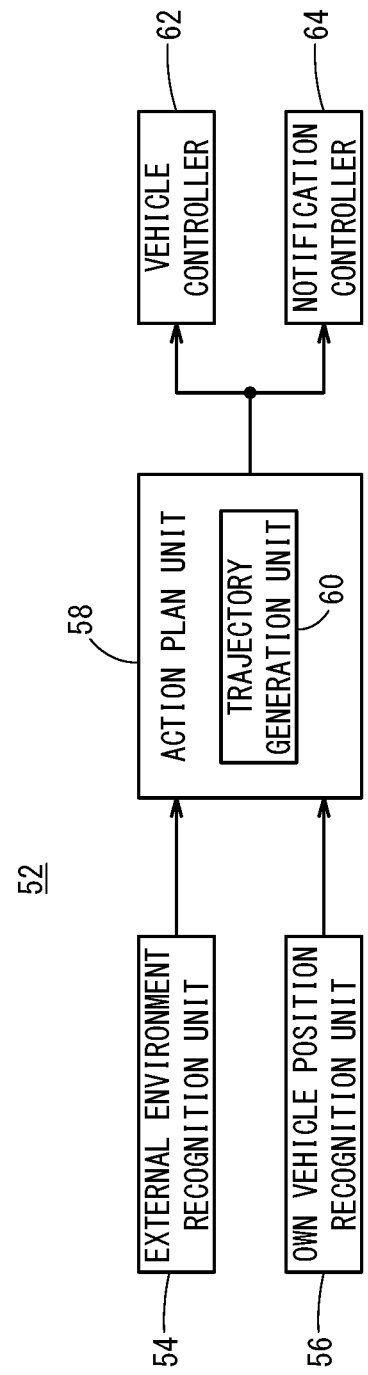
FIG. 2 is a function block diagram of a calculation device.

The controller 50 is configured by an ECU, and includes a calculation device 52 such as a processor and a storage device 66 such as a ROM or a RAM. The controller 50 achieves various functions when the calculation device 52 executes programs stored in the storage device 66. As illustrated in FIG. 2, the calculation device 52 functions as an external environment recognition unit 54, an own vehicle position recognition unit 56, an action plan unit 58, a vehicle controller 62, and a notification controller 64.

The external environment recognition unit 54 recognizes the periphery of the own vehicle 10 on the basis of the information output from the external environment sensor 16, the vehicle-side communications device 28, the map unit 34, and the navigation device 36. For example, the external environment recognition unit 54 recognizes the existence, position, size, type, and traveling direction of the other vehicle 100 that travels or stops near the own vehicle 10 and moreover recognizes the distance and the relative speed between the own vehicle 10 and the other vehicle 100, on the basis of image information acquired by the cameras 18, information acquired by the radars 24 and the LIDARs 26, and the external environment information acquired by the first communications device 30. In addition, the external environment recognition unit 54 recognizes the shape and the position of a recognition object included in the road environment (such as the road 110, a lane mark 126, a median strip, or facility or space near the road) on the basis of the image information acquired by the cameras 18, the information acquired by the radars 24 and the LIDARs 26, a high-precision map stored in the map unit 34, the map information 42 stored in the navigation device 36, and the external environment information acquired by the second communications device 32. The external environment recognition unit 54 recognizes a signal of a traffic light (whether travel is allowed or prohibited) on the basis of the image information acquired by the cameras 18 and the external environment information acquired by the second communications device 32.

The own vehicle position recognition unit 56 recognizes the position of the own vehicle 10 on the basis of the information output from the map unit 34 and the navigation device 36.

The action plan unit 58 plans an action that is optimal to the own vehicle 10 on the basis of a recognition result from the external environment recognition unit 54 and the own vehicle position recognition unit 56, and the detected information and stored information of the input system device group 14. For example, the action plan unit 58 plans a behavior of the own vehicle 10 at each time point, and generates a target travel trajectory and a target speed for achieving the behavior. The function of generating the target travel trajectory and the target speed is performed by a trajectory generation unit 60. If a scheduled route is set, the action plan unit 58 plans the action to cause the own vehicle 10 to reach the destination along the scheduled route, and if the scheduled route is not set, the action plan unit 58 plans the action to cause the own vehicle 10 to travel following the current road. Also, the action plan unit 58 plans the action other than the travel control, such as the content of the notification to the occupant, the timing of the notification, and the timing of operating the blinker 80.

The vehicle controller 62 controls the output system device group 70 on the basis of the action planned by the action plan unit 58. For example, the vehicle controller 62 calculates a steering instruction value based on the target travel trajectory generated by the trajectory generation unit 60, and an acceleration/deceleration instruction value based on the target speed, and outputs control instructions to the driving force output device 72, the steering device 74, and the braking device 76. The vehicle controller 62 outputs the instruction of operating the blinker 80 to the direction indicator 78 before the steering.

The notification controller 64 outputs the notification instruction to the notification device 82 on the basis of a notification action planned by the action plan unit 58.

The storage device 66 illustrated in FIG. 1 stores numerals such as thresholds used in comparison, determination, or the like in each process, in addition to various programs to be executed by the calculation device 52.

2. Circumstances Assumed in the Present Embodiment

Figure 3:
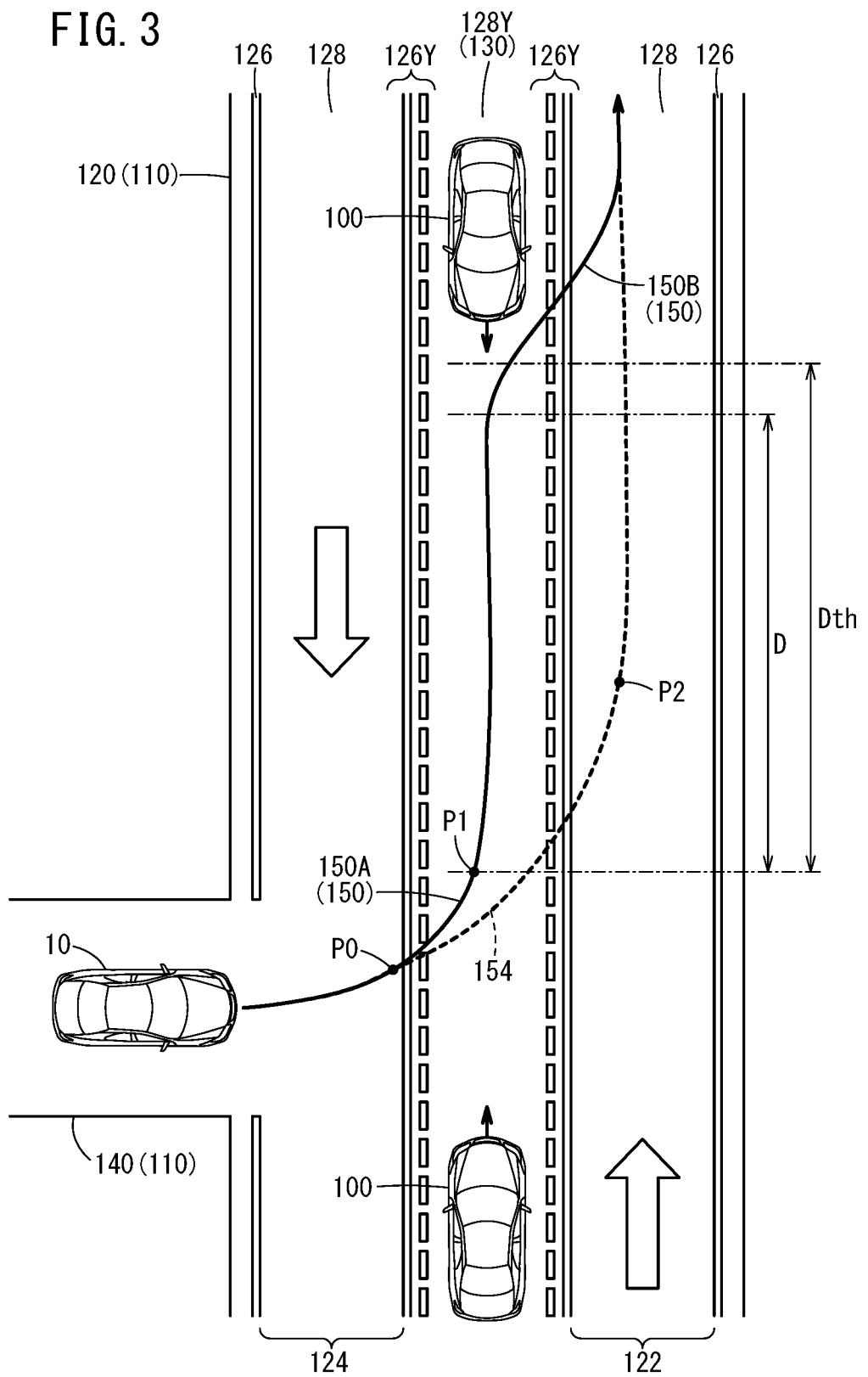
FIG. 3 is a diagram illustrating a travel trajectory generated when an own vehicle enters a first travel path by turning left from a second road in a scene where a particular section is provided between the first travel path and a second travel path.
Figure 4:
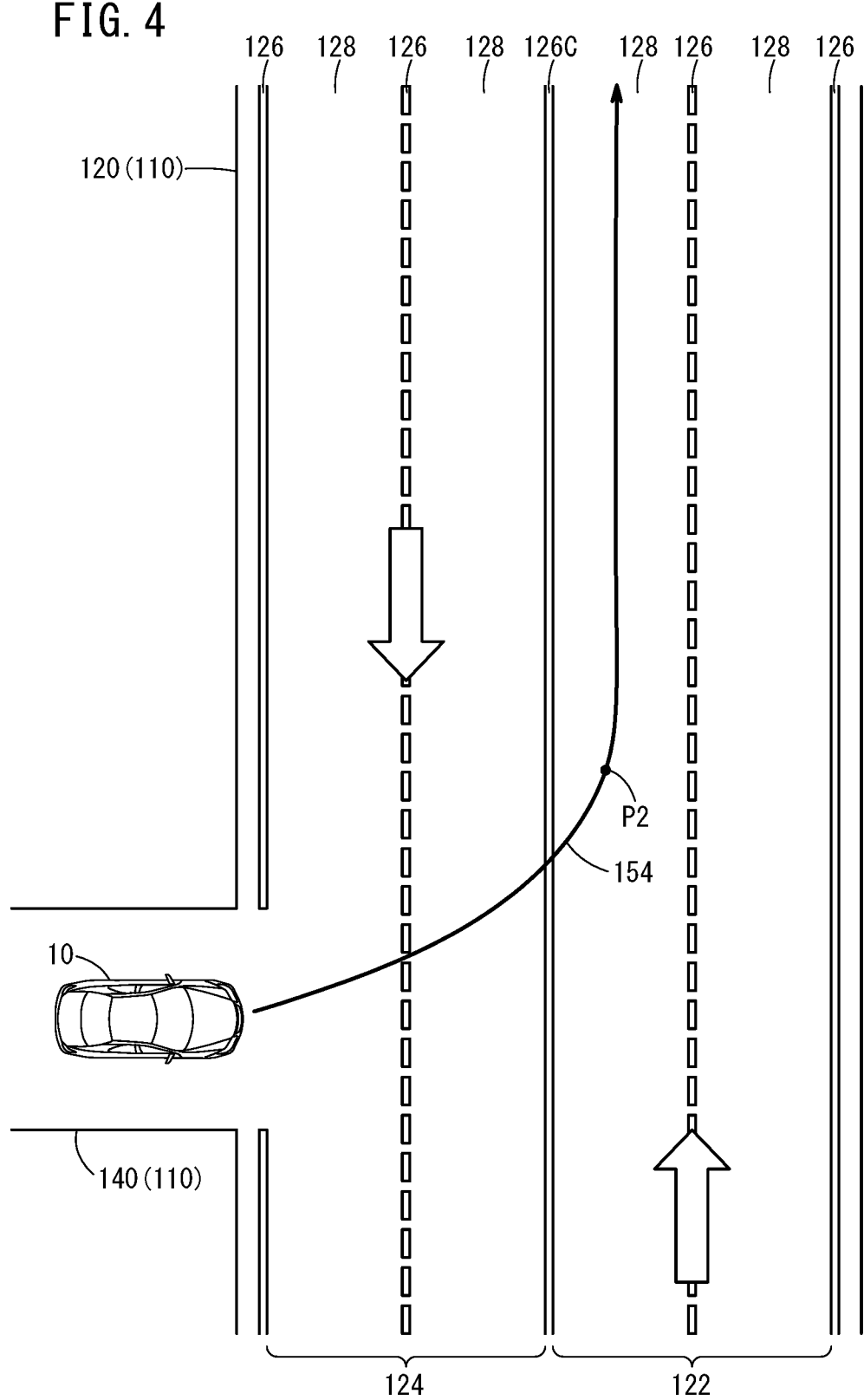
FIG. 4 is a diagram illustrating a travel trajectory generated when the own vehicle enters the first travel path by turning left from the second road in a scene where the particular section is not provided between the first travel path and the second travel path.

FIG. 3 and FIG. 4 illustrate circumstances that are assumed in the present embodiment. In the road 110 illustrated in FIG. 3 and FIG. 4, vehicles keep to the right. As illustrated in FIG. 3 and FIG. 4, a first road 120 includes a first travel path 122 and a second travel path 124 in which vehicles travel in opposite (counter) directions. On the second travel path 124 side of the first road 120, there is a second road 140 intersecting with the first road 120. The first road 120 is a main road, while the second road 140 is a side road. Between the first travel path 122 and the second travel path 124 in the first road 120 in FIG. 3, a particular section 130 that is adjacent to both travel paths is provided, and the particular section 130 is not provided to the first road 120 in FIG. 4. The particular section 130 in FIG. 3 is a yellow lane 128Y that is sectioned on both sides in a width direction by two-line lane marks 126Y each including a yellow solid line and a yellow dashed line. The yellow lane 128Y is a travel lane 128 that is provided in the road 110 in U.S.A., for example, and allows vehicles to travel in opposite directions. When a vehicle in the first travel path 122 will enter an area on the second travel path 124 side (second road 140, etc.) by turning left, the vehicle moves to the yellow lane 128Y and travels in the yellow lane 128Y before turning left. When a vehicle in the second travel path 124 is going to enter an area on the first travel path 122 side by turning left, the vehicle turns left by using the yellow lane 128Y similarly. In addition, when a vehicle in the second road 140 will enter the first travel path 122 by turning left, the vehicle enters the yellow lane 128Y and travels in the yellow lane 128Y before moving to the travel lane 128 of the first travel path 122. FIG. 3 and FIG. 4 show travel trajectories (first travel trajectory 150, second travel trajectory 154) that are generated when the own vehicle 10 in the second road 140 enters the first travel path 122 by turning left.

3. Operation of Vehicle Control Device 12

Figure 5:
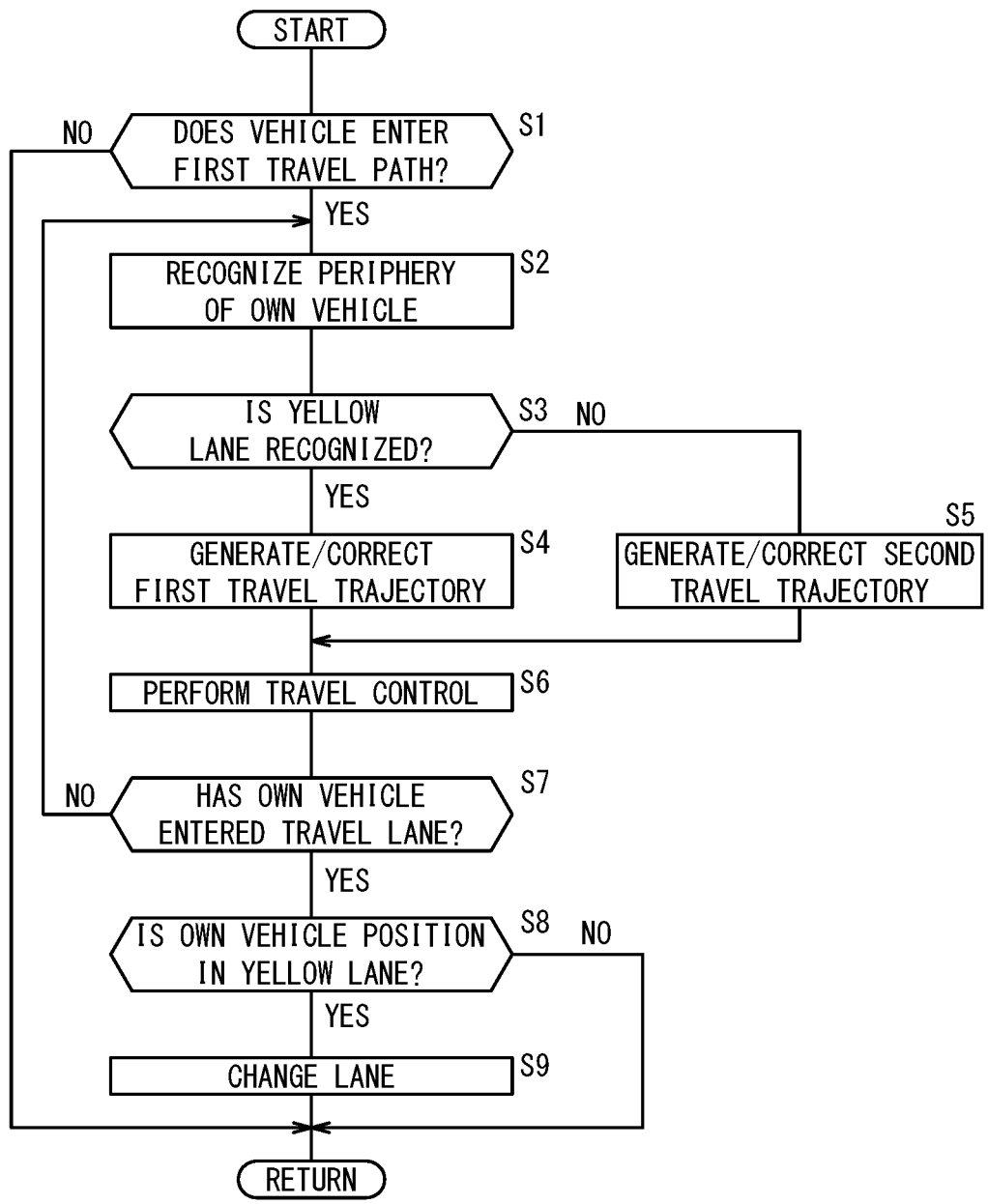
FIG. 5 is a flowchart of a process performed by the vehicle control device according to the present embodiment.

An operation of the vehicle control device 12 is described with reference to FIG. 5. In step S1, the action plan unit 58 determines an event that is generated in the own vehicle 10 on the basis of the position of the own vehicle 10 that is recognized by the own vehicle position recognition unit 56, the map information 42 or the information of the map unit 34, and the scheduled route. As illustrated in FIG. 3 and FIG. 4, when the own vehicle 10 traveling on the second road 140 has approached the first road 120, an event of entering the first travel path 122 or the second travel path 124 from the second road 140 is generated. When the own vehicle 10 enters the first travel path 122 by crossing the second travel path 124 (step S1: YES), the process advances to step S2 and a left-turning process is performed. On the other hand, if the own vehicle 10 does not enter the first travel path 122 (step S1: NO), a series of processes in FIG. 5 is terminated once.

In step S2, the external environment recognition unit 54 recognizes the periphery of the own vehicle 10, here each travel lane 128 included in the first road 120, on the basis of the latest information output from the input system device group 14. For example, the external environment recognition unit 54 can recognize each travel lane 128 included in the first road 120 on the basis of the map information 42 or the information of the map unit 34.

In addition, the external environment recognition unit 54 can recognize each travel lane 128 included in the first road 120 on the basis of the image information acquired by the cameras 18. In this case, the external environment recognition unit 54 recognizes the lane marks 126 (including the yellow lane marks 126Y, a center line 126C) on the basis of the image information. If the travel lane 128 that is sectioned on both sides by the yellow lane marks 126Y or the two-line lane marks 126Y each consisting of the inner dashed line and the outer solid line is recognized at a center of the first road 120, this travel lane 128 is recognized as the yellow lane 128Y.

When recognizing each travel lane 128 using the image information, the external environment recognition unit 54 uses the image information acquired by the side camera 22 which has priority over the image information acquired by the front camera 20. For example, a process of recognizing the image information acquired by the side camera 22 has priority over a process of recognizing the image information acquired by the front camera 20. In this case, the side camera 22 may photograph at shorter intervals than the front camera 20, and the recognition process based on the image information acquired by the side camera 22 may be performed more frequently than the recognition process based on the image information acquired by the front camera 20. If the image information acquired by the side camera 22 has priority over the image information acquired by the front camera 20, the priority relation regarding the image information acquired by the front camera 20 and the side camera 22 may be reset or restored after the yellow lane 128Y is recognized. The camera 18 that can recognize the lane mark 126 more easily may be selected as appropriate. For example, the external environment recognition unit 54 may determine the angles of the optical axes of the cameras 18 relative to the first road 120 on the basis of at least one piece of information selected from the detection result from the position measurement unit 38, the detection result from the yaw rate sensor, and the map information 42, and prioritize the image information acquired by the camera 18 with the smaller angle. In this case, the directions of the optical axes of the cameras 18 are stored in advance in the storage device 66.

In the case where the yellow lane 128Y exists as illustrated in FIG. 3, the external environment recognition unit 54 recognizes the yellow lane 128Y. In this case (step S3: YES), the process advances to step S4. On the other hand, in the case where the yellow lane 128Y does not exist as illustrated in FIG. 4, the external environment recognition unit 54 does not recognize the yellow lane 128Y. In this case (step S3: NO), the process advances to step S5.

When the process has advanced from step S3 to step S4, the trajectory generation unit 60 of the action plan unit 58 generates the first travel trajectory 150 (solid line in FIG. 3) and the target speed. Specifically, the trajectory generation unit 60 generates an A-trajectory 150A that causes the own vehicle 10 to enter the yellow lane 128Y and travel along the extending direction of the first travel path 122. The A-trajectory 150A is a travel trajectory connecting the position of the own vehicle 10 and a target point P1 in the yellow lane 128Y extended in the left-turning direction with a smooth curved line. The A-trajectory 150A makes the vehicle-length direction of the own vehicle 10 substantially parallel to the extending direction of the yellow lane 128Y at the target point P1. The A-trajectory 150A is included in the first travel trajectory 150. Note that if the A-trajectory 150A is already generated, the trajectory generation unit 60 corrects the A-trajectory 150A on the basis of the latest recognition result from the external environment recognition unit 54 as necessary.

When the process has advanced from step S3 to step S5, the trajectory generation unit 60 of the action plan unit 58 generates the second travel trajectory 154 (a dashed line in FIG. 3, a solid line in FIG. 4) and the target speed. Specifically, the trajectory generation unit 60 generates the second travel trajectory 154 that causes the own vehicle 10 to enter the first travel path 122. The second travel trajectory 154 is a travel trajectory connecting the position of the own vehicle 10 and a target point P2 in the travel lane 128 extended in the left-turning direction with a smooth curved line. The second travel trajectory 154 makes the vehicle-length direction of the own vehicle 10 substantially parallel to the extending direction of the travel lane 128 at the target point P2. Note that if the second travel trajectory 154 is already generated, the trajectory generation unit 60 corrects the second travel trajectory 154 on the basis of the latest recognition result from the external environment recognition unit 54 as necessary. In the example illustrated in FIG. 3, the rightmost travel lane 128 is the target; in the example illustrated in FIG. 4, the travel lane 128 closest to the center line 126C is the target.

As illustrated in FIG. 3, the own vehicle 10 travels along the second travel trajectory 154 and the external environment recognition unit 54 recognizes the yellow lane 128Y for the first time when the own vehicle 10 has reached a point P0 before entering the yellow lane 128Y (step S3: YES). Here, the trajectory generation unit 60 generates the first travel trajectory 150 (A-trajectory 150A) that connects the point P0 and the target point P1 in the yellow lane 128Y extended in the left-turning direction with the smooth curved line.

In step S6, the vehicle controller 62 performs the travel control of the own vehicle 10 on the basis of the first travel trajectory 150 (A-trajectory 150A) and the target speed generated in step S4, or the second travel trajectory 154 and the target speed generated in step S5. The driving force output device 72, the steering device 74, and the braking device 76 operate in accordance with the control instruction from the vehicle controller 62.

In step S7, the external environment recognition unit 54 recognizes whether the own vehicle 10 has entered the target travel lane 128. When the external environment recognition unit 54 has recognized the lane marks 126 on the left and right sides of the own vehicle 10 on the basis of the image information and the own vehicle 10 has reached the target point P1 or P2, the external environment recognition unit 54 recognizes that the own vehicle 10 has entered the target travel lane 128. If the own vehicle 10 has entered the target travel lane 128 (step S7: YES), the left-turning process performed from step S2 is terminated and the process advances to step S8. On the other hand, if the own vehicle 10 has not entered the target lane 128 yet (step S7: NO), the process returns to step S2.

When the process has advanced from step S7 to step S8, whether the own vehicle 10 is in the yellow lane 128Y is determined. At the end of step S7, the own vehicle 10 has already entered the yellow lane 128Y or the travel lane 128 in the first travel path 122. If the own vehicle 10 is in the yellow lane 128Y (step S8: YES), the process advances to step S9. On the other hand, if the own vehicle 10 is not in the yellow lane 128Y (step S8: NO), a series of processes in FIG. 5 is terminated once.

When the process has advanced from step S8 to step S9, the own vehicle 10 changes the lane from the yellow lane 128Y to the travel lane 128 in the first travel path 122. From the time point when step S8 ends, the action plan unit 58 measures a travel distance D for which the own vehicle 10 has traveled in the yellow lane 128Y on the basis of detection values from the travel distance sensor. The trajectory generation unit 60 generates a B-trajectory 150B and the target speed so that the lane can be changed from the yellow lane 128Y to the travel lane 128 in the first travel path 122 before the travel distance D becomes a predetermined distance Dth stored in the storage device 66. The B-trajectory 150B is included in the first travel trajectory 150. The vehicle controller 62 performs lane change control of the own vehicle 10 on the basis of the B-trajectory 150B and the target speed before the travel distance D becomes the predetermined distance Dth.

4. Modifications

In step S2 in FIG. 5, if recognizing a first other vehicle 100 and a second other vehicle 100 that travel in opposite directions in the same travel lane 128, the external environment recognition unit 54 may recognize that the travel lane 128 where the first other vehicle 100 and the second other vehicle 100 travel is the yellow lane 128Y.

It is assumed that, in step S6 in FIG. 5, before the own vehicle 10 crosses the second travel path 124, the external environment recognition unit 54 recognizes the yellow lane 128Y and the other vehicle 100 that travels in the yellow lane 128Y in the direction opposite to the direction where the own vehicle 10 will travel. In this case, the action plan unit 58 plans an action to keep the own vehicle 10 within the second travel path 124. Here, the vehicle controller 62 outputs a control instruction to the driving force output device 72 and the braking device 76 so as to decelerate or stop the own vehicle 10. When the external environment recognition unit 54 recognizes that the other vehicle 100 has passed the yellow lane 128Y ahead of the own vehicle 10, the vehicle controller 62 performs the travel control of the own vehicle 10 on the basis of the first travel trajectory 150 and the target speed.

In step S9 in FIG. 5, the action plan unit 58 may measure a travel time T instead of the travel distance D. Then, the trajectory generation unit 60 may generate the B-trajectory 150B and the target speed so that the lane can be changed from the yellow lane 128Y to the travel lane 128 in the first travel path 122 before the travel time T becomes a predetermined time Tth stored in the storage device 66.

The particular section 130 may be other section than the yellow lane 128Y. For example, the particular section 130 may be a channelizing zone (marking) provided on the road 110 in Japan etc. In this case, the external environment recognition unit 54 recognizes the presence or absence of a zone having a stripe pattern surrounded by a white solid line (called a "zebra zone").

In the above embodiment, the present invention is applied to a scene where the vehicle in the second road 140 enters the first travel path 122 in the first road 120 by crossing the second travel path 124. However, the present invention is also applicable to a scene where the vehicle in an area beside the first road 120, such as a parking lot, enters the first travel path 122 by crossing the second travel path 124.

In some cases, the external environment information acquired by the vehicle-side communications device 28 includes the information indicating the presence or absence of the yellow lane 128Y but excludes the detailed positional information. In such cases, the action plan unit 58 may assume that the yellow lane 128Y exists in the first road 120 on the basis of the external environment information, and generate the virtual yellow lane 128Y before performing various controls.

In the above embodiment, the A-trajectory 150A and the B-trajectory 150B are generated at individual timings to form the first travel trajectory 150. Alternatively, the A-trajectory 150A and the B-trajectory 150B may be generated at the same time to form the first travel trajectory 150. That is to say, at the time point of step S4 in FIG. 5, the first travel trajectory 150 combining the A-trajectory 150A and the B-trajectory 150B may be generated.

5. Summary of the Present Embodiment and Modifications

The vehicle control device 12 includes the external environment recognition unit 54 configured to recognize the peripheral state of the own vehicle 10; the trajectory generation unit 60 configured to generate the travel trajectory of the own vehicle 10 on the basis of the recognition result from the external environment recognition unit 54; and the vehicle controller 62 configured to cause the own vehicle 10 to travel along the travel trajectory. When the own vehicle 10 enters the first travel path 122 from outside the first travel path 122, if the external environment recognition unit 54 recognizes the particular section 130 adjacent to the first travel path 122, the trajectory generation unit 60 is configured to generate the first travel trajectory 150 (A-trajectory 150A, B-trajectory 150B) that causes the own vehicle 10 to enter the first travel path 122 after the travel along the first travel path 122 inside the particular section 130. On the other hand, if the external environment recognition unit 54 does not recognize the particular section 130, the trajectory generation unit 60 is configured to generate the second travel trajectory 154 that causes the own vehicle 10 to directly enter the first travel path 122 from outside the first travel path 122.

In the above structure, the first travel trajectory 150 is generated in the case where the particular section 130 is provided adjacent to the first travel path 122, and the second travel trajectory 154 is generated in the case where the particular section 130 is not provided. Thus, the optimal travel control in accordance with the presence or absence of the particular section 130 can be performed.

The trajectory generation unit 60 is configured to generate the first travel trajectory 150 in the case where the external environment recognition unit 54 has recognized the particular section 130 after the second travel trajectory 154 was generated and before the own vehicle 10 enters the first travel path 122.

The above structure enables the own vehicle 10 to enter the particular section 130 because the first travel trajectory 150 is generated even after the second travel trajectory 154 is generated.

The vehicle control device 12 includes the front camera 20 configured to photograph the area ahead of the own vehicle 10, and the side camera 22 configured to photograph the area beside the own vehicle 10 as compared to the front camera 20. The external environment recognition unit 54 is configured to recognize the peripheral state by the image information from the side camera 22 which has priority over the image information from the front camera 20.

In the above structure, the image information from the side camera 22, which can recognize the lane mark 126 extended beside the own vehicle 10 easily, has priority before or while the own vehicle 10 turns right or left; therefore, the particular section 130 can be recognized with higher accuracy. In addition, the calculation load for performing the recognition on the basis of the image information from the front camera 20 can be reduced.

The external environment recognition unit 54 is configured to, if recognizing the travel lane 128 (the yellow lane 128Y) that is sectioned on both sides in the width direction by the yellow lane marks 126Y or the two-line lane marks 126Y, recognize this travel lane 128 as the particular section 130.

The above structure enables the own vehicle 10 to enter the first travel path 122 after traveling in what is called the yellow lane 128Y that is sectioned by the yellow lane marks 126Y.

The vehicle control device 12 further includes the map information 42 including the information regarding the particular section 130 included in the first road 120. The trajectory generation unit 60 is configured to, if the external environment recognition unit 54 recognizes the particular section 130 on the basis of the map information 42, generate the first travel trajectory 150, and if the external environment recognition unit 54 does not recognize the particular section 130 on the basis of the map information 42, generate the second travel trajectory 154.

In the above structure, the presence or absence of the particular section 130 is recognized by using the map information 42 that is stored in advance; therefore, the presence or absence of the particular section 130 can be recognized correctly and easily.

If the external environment recognition unit 54 recognizes the travel lane 128 (yellow lane 128Y) where vehicles can travel in opposite directions as the particular section 130 and recognizes the other vehicle 100 that travels in the travel lane 128 in the direction opposite to the direction where the own vehicle 10 is going to travel, the vehicle controller 62 is configured to cause the own vehicle 10 to travel along the first travel trajectory 150 after the external environment recognition unit 54 recognizes that the other vehicle 100 has passed the travel lane 128 ahead of the own vehicle 10.

The above structure causes the own vehicle 10 to enter the particular section 130 after the other vehicle 100 has passed the travel lane 128 (yellow lane 128Y) corresponding to the particular section 130; therefore, it is possible to prevent the own vehicle 10 and the other vehicle 100 from facing each other in the particular section 130.

If the external environment recognition unit 54 recognizes the first other vehicle 100 and the second other vehicle 100 that travel in opposite directions in the same travel lane 128, the external environment recognition unit 54 is configured to recognize the travel lane 128 as the particular section 130.

In the above structure, the presence or absence of the particular section 130 is recognized on the basis of the behavior of the other vehicles 100 that are easily recognized; therefore, the presence or absence of the particular section 130 can be recognized correctly and easily.

The vehicle controller 62 is configured to cause the own vehicle 10 to enter the travel path from the particular section 130 before the distance (travel distance D) for which the own vehicle 10 has traveled in the particular section 130 becomes the predetermined distance Dth or the time (travel time T) for which the own vehicle 10 has traveled in the particular section 130 becomes the predetermined time Tth.

In the above structure, it is possible to prevent the own vehicle 10 from traveling more than necessary in the particular section 130.

The present invention is not limited to the embodiment above, and can employ various structures without departing from the gist of the present invention.

What is claimed is:

1. A vehicle control device comprising one or more processors that execute computer executable instructions stored in a memory, wherein the one or more processors execute the computer-executable instructions to cause the vehicle control device to:
   recognize a peripheral state of an own vehicle;
   generate a travel trajectory of the own vehicle on a basis of a recognition result; and
   cause the own vehicle to travel along the travel trajectory, wherein in a case where there are a first travel path the own vehicle plans to enter, a second travel path a travel direction of which is opposite to a travel direction of the first travel path, and a particular section that is adjacent to and between the first travel path and the second travel path and is a travel lane that allows vehicles to travel in opposite directions, and the own vehicle is caused to enter the first travel path across the second travel path, the one or more processors cause the vehicle control device to generate a first travel trajectory that causes the own vehicle to enter the first travel path after a travel along the travel direction of the first travel path inside the particular section.

2. The vehicle control device according to claim 1, further comprising:
   a front camera configured to photograph an area ahead of the own vehicle; and
   a side camera configured to photograph an area beside the own vehicle as compared to the front camera,
   wherein the one or more processors cause the vehicle control device to recognize the peripheral state by image information from the side camera which has priority over image information from the front camera.

3. The vehicle control device according to claim 1, wherein the one or more processors cause the vehicle control device to recognize a travel lane that is sectioned on both sides in a width direction by yellow lane marks or two-line lane marks, recognize this travel lane as the particular section.

4. The vehicle control device according to claim 1, wherein in a case where the vehicle control device recognizes another vehicle that travels in the particular section in a direction opposite to a direction where the own vehicle is going to travel, the one or more processors cause the vehicle control device to cause the own vehicle to travel along the first travel trajectory after the vehicle control device recognizes that the another vehicle has passed the travel lane ahead of the own vehicle.

5. The vehicle control device according to claim 1, wherein in a case where the vehicle control device recognizes a first other vehicle and a second other vehicle that travel in opposite directions in the same travel lane, the one or more processors cause the vehicle control device to recognize the travel lane as the particular section.

6. The vehicle control device according to claim 1, wherein the one or more processors cause the vehicle control device to generate the first travel trajectory that causes the own vehicle to enter the first travel path from the particular section before a distance for which the own vehicle has traveled in the particular section becomes a predetermined distance or a time for which the own vehicle has traveled in the particular section becomes a predetermined time.

7. The vehicle control device according to claim 1, wherein the one or more processors cause the vehicle control device to generate a second travel trajectory that causes the own vehicle to directly enter the first travel path from outside the first travel path in a case where there is not the particular section.

8. The vehicle control device according to claim 7, wherein the one or more processors cause the vehicle control device to generate the first travel trajectory in a case where the vehicle control device recognizes the particular section after the second travel trajectory was generated and before the own vehicle enters the first travel path.

9. The vehicle control device according to claim 7, further comprising map information including information regarding the particular section included in the road,
   wherein the one or more processors cause the vehicle control device to, in a case where the vehicle control device recognizes the particular section on a basis of the map information, generate the first travel trajectory, and in a case where the vehicle control device does not recognize the particular section on the basis of the map information, generate the second travel trajectory.

10. The vehicle control device according to claim 1, wherein the particular section is a yellow lane.

* * * * *

UNITED STATES PATENT AND TRADEMARK OFFICE
CERTIFICATE OF CORRECTION

PATENT NO. : 11,169,526 B2  
APPLICATION NO. : 16/276175  
DATED : November 9, 2021  
INVENTOR(S) : Suguru Yanagihara, Hiroshi Miura and Marina Saikyo Page 1 of 1

It is certified that error appears in the above-identified patent and that said Letters Patent is hereby corrected as shown below:

On the Title Page

Item (73):
Change "Honda Motor Company, Ltd.," to --Honda Motor Co., Ltd.--

Signed and Sealed this
First Day of March, 2022

Drew Hirshfeld
*Performing the Functions and Duties of the*
*Under Secretary of Commerce for Intellectual Property and*
*Director of the United States Patent and Trademark Office*